May 14, 1929.                    C. R. SHORT                    1,712,937
                              COMPOSITE PISTON
                          Filed Feb. 19, 1926          2 Sheets-Sheet 1

Inventor
CHARLES R. SHORT

By Blackmore, Spencer & Fleit
                              Attorneys

May 14, 1929.                C. R. SHORT                1,712,937
                          COMPOSITE PISTON
                      Filed Feb. 19, 1926        2 Sheets-Sheet 2

Inventor
CHARLES R. SHORT

By Blackmore, Spencer & Fluit
Attorneys

Patented May 14, 1929.

1,712,937

UNITED STATES PATENT OFFICE.

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE.

COMPOSITE PISTON.

Application filed February 19, 1926. Serial No. 89,362.

This invention relates to pistons particularly for internal combustion or other high speed engines. It is among the objects of the invention to provide an engine piston of small mass having features which are adapted for use under varying conditions of temperature so that the clearance between the piston and the cylinder wall will remain practically constant under a relatively wide range of temperature.

Further objects and advantages of the present invention will be apparent from the following description, reference being had to the accompanying drawings, wherein a preferred form of embodiment of the present invention is clearly shown.

Figure 1:
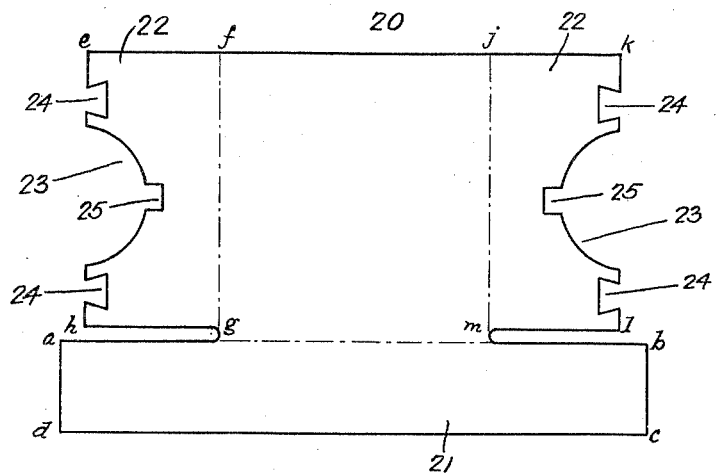
Fig. 1 is a plan view of a blank used in forming the skirt of the piston.

The first step in the process of manufacturing a piston according to the present invention is to provide two blanks 20 of sheet metal, one of these being shown in Fig. 1. Each blank comprises a rectangular portion $abcd$ having a length $ab$ equal to one half the circumference of a completely cylindrical portion which is included in the piston skirt. The width $ad$ of this rectangle is less than the distance from the lower edge of the skirt to a piston pin boss of the finished piston. The rectangle $abcd$ occupies a portion of the blank adjacent the line $dc$ which later becomes the bottom edge of the piston skirt. The blank includes also two end portions $efgh$ and $jklm$ which are spaced from the rectangle $abcd$ and terminate short of the lines $ad$ and $bc$. Each end portion 22 is provided with a semi-circular notch or recess 23 which is adapted to embrace a portion of the material which is to comprise a piston pin boss. If desired, each end portion 22 may be provided with notches 24 and 25 which serve to receive the metal which is to be joined by a casting process through the part 22.

Figure 3:
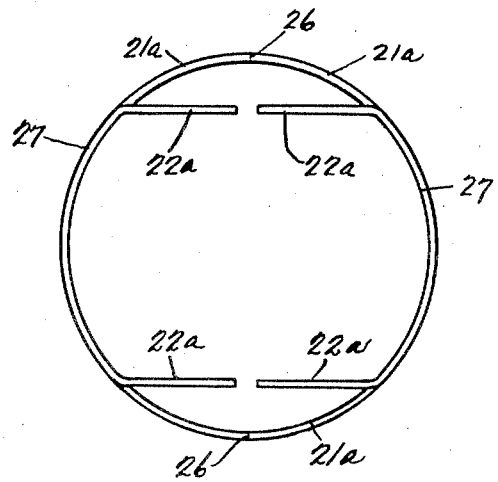
Fig. 3 is a top view of the body shown in Fig. 2.
Figure 4:
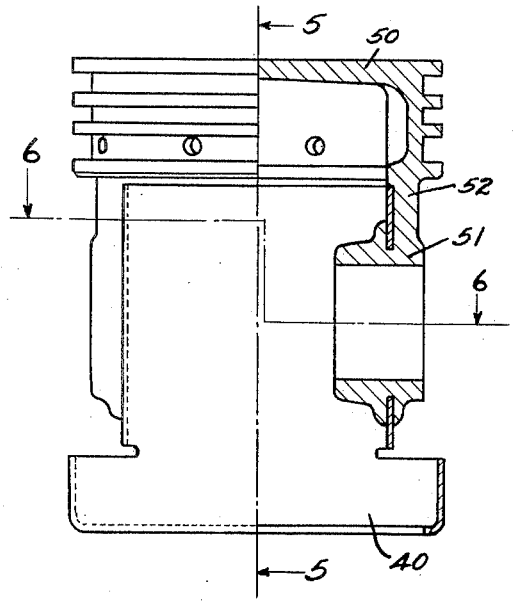
Fig. 4 is a side view partly in section of a piston having as its skirt the tubular body as shown in Figs. 2 and 3, the section shown in Fig. 4 being taken along the axis of the piston pin boss.
Figure 5:
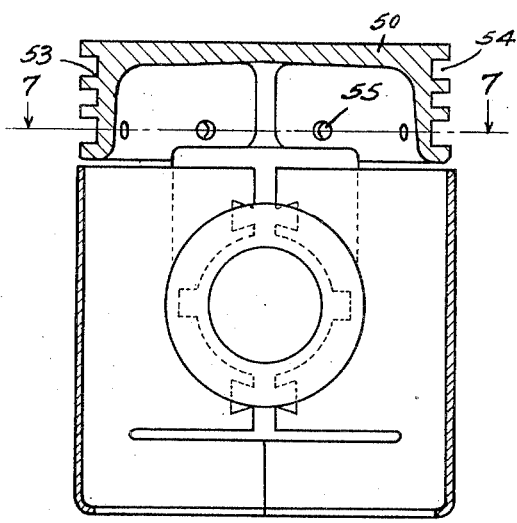
Fig. 5 is a sectional view on the line 5—5 of Fig. 4.
Figure 6:
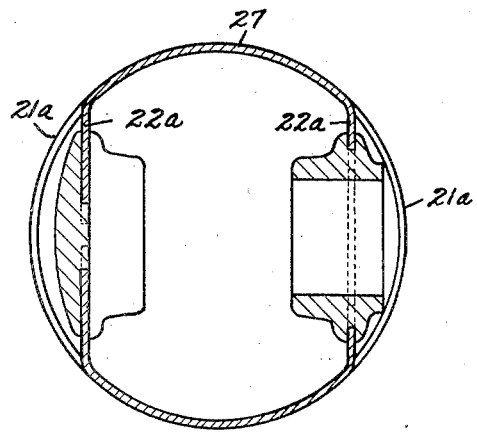
Fig. 6 is a sectional view on the line 6—6 of Fig. 4.
Figure 7:
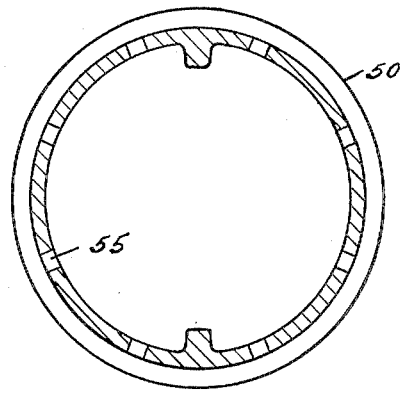
Fig. 7 is a sectional view on the line 7—7 of Fig. 5.

The next step is to bend the rectangle 21 into a semi-cylindrical form designated $21^a$ in Fig. 3, and to bend the intermediate portion represented by the rectangle $fjmg$ into cylindrical form which is continuous with the portions $21^a$ and has the same curvature.

Figure 2:
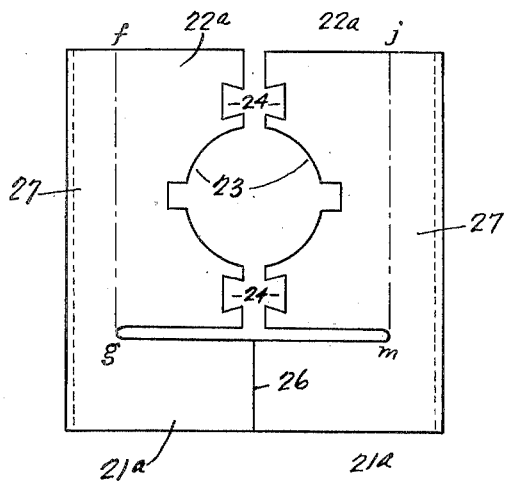
Fig. 2 is a side view of a tubular body which is formed by joining two of the blanks shown in Fig. 1.

The next step is to join the ends of the semi-cylindrical portions $21^a$ which may be joined by a welding operation at the joints 26. The parts $21^a$ will then form a completely cylindrical portion, from which extend two diametrically opposite portions 27 which are segments of cylinders. Then the portions 22 of the blanks are bent into the positions $22^a$ shown in Figs. 2 and 3 so as to provide pairs of anchoring members. Each pair of members $22^a$, after being bent as shown in Figs. 2 and 3, will have their anchoring notches 23 so located that said notches will embrace a cylindrical body which is to be joined later with the skirt for the purpose of providing piston pin bosses.

By the method thus far described there has been provided a tubular body having a completely cylindrical portion which is joined by two diametrically opposite segmental cylindrical portions 27 with diametrically opposite pairs of anchoring members $22^a$, $22^a$. The distance between the pairs of anchoring members may change slightly with variations in temperature without any appreciable deformation of the completely cylindrical portion $21^a$, $21^a$, or the segmental cylindrical portion 27. It is quite obvious that the end portions 22 can be bent as shown in Figs. 2 and 3 along the lines $fg$ and $jm$ before the welding operation at the joints 26 as well as afterward.

The next step in the manufacture of the piston is to place the tubular skirt body which is designated in its entirety by numeral 40 in a suitable mold which is prepared for forming cast metal into an integral structure which comprises a piston head 50 and piston pin bosses 51, which are joined to the head by bridging members 52. The mold is so prepared and the skirt body is so arranged in it that the material forming the bosses 51 will be cast into the space between the contiguous portions of the anchoring members 22ª. The space between the anchoring members will be filled with the material of the bosses and the anchoring members will provide a means of attachment of the piston skirt to the bosses.

The side wall 53 of the head 50 is provided with piston ring grooves 54 the lower groove being apertured at 55 to provide for the drainage of lubricant scraped from the walls of the cylinder in which the piston is used.

The material comprising the head and boss is preferably of a metal of relatively good heat conductivity so as to prevent hot spots in the piston head. One suitable material is aluminum. The skirt is made preferably of sheet steel which has relatively great strength and rigidity for the mass of material involved.

It is apparent that the head will expand to a greater degree than the skirt under these conditions. However, these differences in expansion will not affect the contour of the skirt because the skirt and piston are joined only at the piston pin bosses. When the piston head expands to a greater degree than the piston skirt there will be a slight spreading apart of the piston bosses relative to each other. But this will not affect the contour of the portions 27 and 21ª to any appreciable degree since the metal between the anchoring portions 22ª will expand to counteract the shortening due to bending about the point where they merge into the portions 27.

While the form of embodiment of the present invention as herein disclosed, constitutes a preferred form, it is to be understood that other forms might be adopted all coming within the scope of the claims which follow.

What is claimed is as follows:

1. A piston having a sheet metal skirt which is substantially circular in section except for opposite parallel plane portions, each of which is divided in the axial direction, and a cast metal head having integral piston bosses cast united to said opposite parallel plane portions across the divisions thereof.

2. A piston having a sheet metal skirt and cast metal head and piston pin bosses, said skirt having a cylindrical lower portion and cylindrical segments in its upper portion, anchoring members formed at the ends of said segments and extending inwardly toward said bosses, the inner ends of said members being spaced apart and embedded in said bosses.

3. A piston comprising a head and piston pin bosses of cast material and a thin-walled skirt portion substantially cylindrical in a region adjacent the lower end of the skirt and with cylindrical segmental portions intermediate the piston pin bosses, anchoring members being provided at the terminations of said segmental portions and extending inwardly toward the axis of said bosses and embedded therein at their inner ends, the said inner ends of said members in each boss being spaced apart.

4. A piston, a cast metal head and piston pin bosses, and a sheet metal skirt, said skirt being formed in two halves each having a semi-cylindrical lower portion and a cylindrical segment in the upper portion on the edges of which are formed anchoring members extending inwardly, said semi-cylindrical portions being welded together at their edges to form a cylindrical skirt portion with the opposed anchoring members of one half extending toward those of the other half, the inner ends of said members being embedded in said bosses.

5. A piston comprising a cast metal head and piston pin bosses of a metal of relatively high conductivity, and a thin-walled skirt portion of a different metal spaced from said head, anchoring members being formed on said skirt portion and extending inwardly toward the axis of the piston pin bosses, the inner ends of said members being embedded in said bosses.

In testimony whereof I affix my signature.

CHARLES R. SHORT.